United States Patent [19]
Schisselbauer et al.

[11] 3,975,010
[45] Aug. 17, 1976

[54] CARD READER WITH IMPROVED PICKING AND TRANSPORT ARRANGEMENT

[75] Inventors: John C. Schisselbauer, Southampton; John J. Dobson, Oreland; James E. Gerhart, Cheltenham, all of Pa.

[73] Assignee: Peripheral Dynamics, Inc., Norristown, Pa.

[22] Filed: Mar. 21, 1975

[21] Appl. No.: 560,784

[52] U.S. Cl. ............................ 271/4; 271/121;
       271/137; 271/167; 271/180; 271/219
[51] Int. Cl.² ..................... B65H 3/06; B65H 3/46
[58] Field of Search ............. 271/3, 4, 10, 37, 80,
       271/109, 114, 117–119, 121, 124, 137, 138,
       167, 180, 182, 219, 224, 272, 161

[56] References Cited
UNITED STATES PATENTS

| | | | |
|---|---|---|---|
| 3,372,923 | 3/1968 | Watson et al. | 271/119 |
| 3,421,754 | 1/1969 | Schaller et al. | 271/161 |
| 3,660,639 | 5/1972 | Cassel | 271/4 |

OTHER PUBLICATIONS
Reidenbach, "Integral Throat Knife and Ramp," IBM Technical Disclosure Bulletin, vol. 14, No. 5, 10–1971.

*Primary Examiner*—Evon C. Blunk
*Assistant Examiner*—Robert Saifer

[57] ABSTRACT

In card reading apparatus of the type for reading data processing type cards, an improved picking arrangement for picking and feeding cards from a contained stack in a predetermined manner. The picking arrangement comprises a throat through which the picked cards pass, the throat having an improved toothing design to optimize picking bad cards thereto. The apparatus incorporates an integrated system design for minimizing contact with the information bearing portions of the cards as they are picked and processed.

18 Claims, 6 Drawing Figures

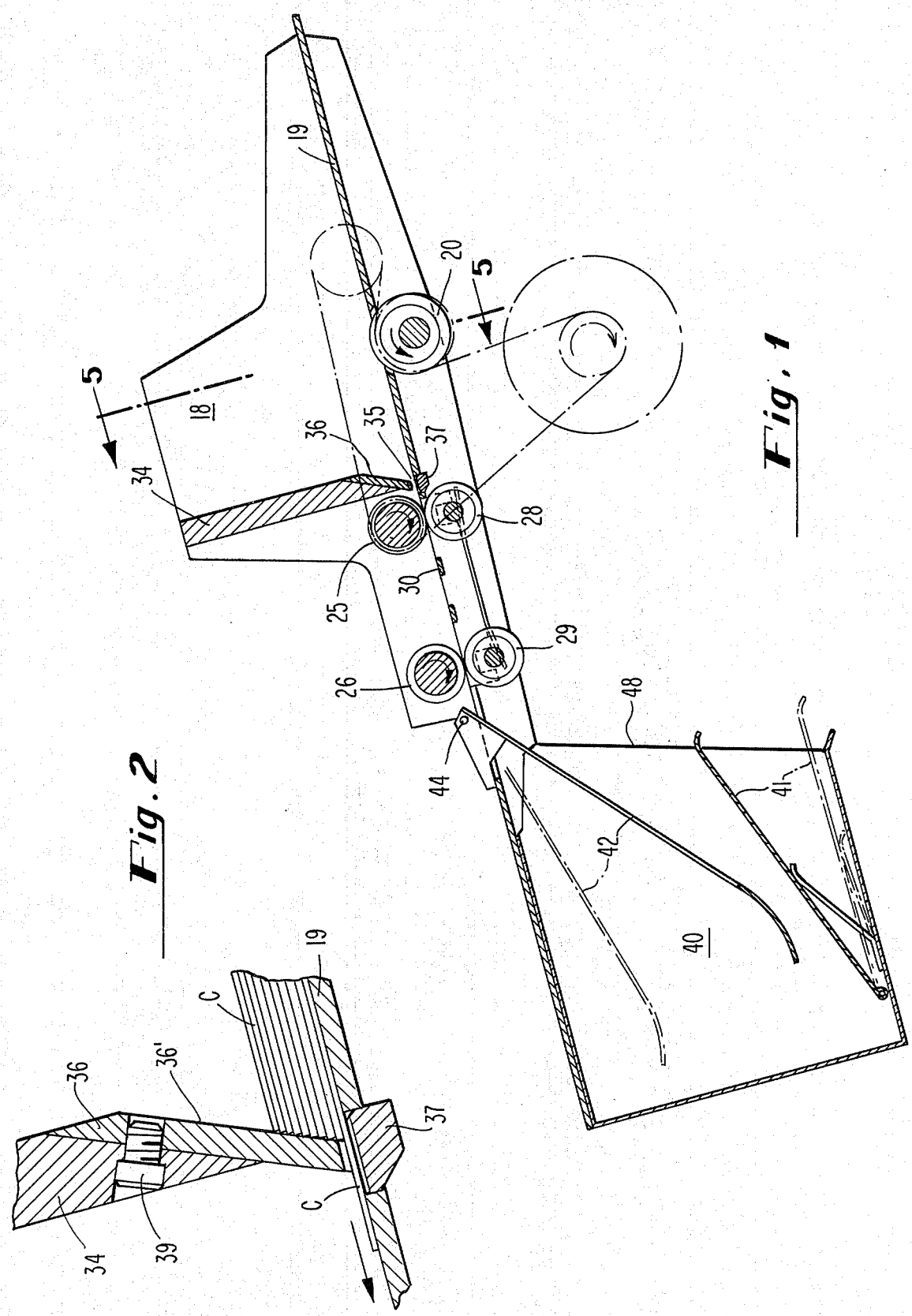

CARD READER WITH IMPROVED PICKING AND TRANSPORT ARRANGEMENT

BACKGROUND OF THE INVENTION

1. Field of the Invention

This invention lies in the field of document handling and reading apparatus and, more particularly, card reading apparatus for reading data processing cards.

2. Description of the Prior Art

In the field of card reading devices, there has been a long standing need to optimize the picking design so as to achieve two somewhat contradictory objectives. First, as is apparent, it is necessary to separate the cards which are to be fed through the equipment and processed, so as to make available one card at a time for processing purposes. Typically in the prior art this is done by transporting the cards through a defined space, or throat area, which is dimensioned so as to permit only one card at a time to pass therethrough. Clearly, if the throat dimension is just barely greater than one card thickness, and clearly less than the thickness of two combined cards, transport of only one card at a time is permitted. Viewing only this first consideration, the closer the throat thickness to simply one card thickness, the greater the separating ability of the card reader, and the less chance that a plurality of cards will be picked simultaneously. At contrast with this criterion is the design criterion of adjusting the throat so as to pass cards which are damaged or otherwise deformed such that their effective thickness is greater than that of the normal card. This is a very practical consideration, since in practice a typical card will have been processed through various pieces of data processing equipment a plurality of times, and statistically a certain number of such cards will become scuffed up, banged around and otherwise damaged so as to effectively increase the card thickness and make them unfit for transport through a throat having a separation of just barely one normal card thickness. In order to accommodate these two competing considerations, the throat separation will typically be set at about 1.5 card thicknesses. However, this compromise arrangement alone is less than totally satisfactory, particularly because it simply doesn't give sufficient allowance for the certain number of damaged cards which must be transported through the reader.

In addition to the above consideration, there is a great need for improvement in picking cards without altering or damaging the middle portion of the leading edge of the card. Most card readers sense the leading edge at its center, and develop basic timing signals from this sensing. Damage to the leading edge, aside from card thickness variations, can alter the very sensitive timing signals. In particular, it has been found that for card readers where the card is fed lengthwise through the throat, prior art systems remain unreliable and are unsatisfactory in the handling of initially undamaged cards. As used hereinabove, the term sidewise feeding refers to feeding the card through the throat such that the leading and trailing edges constitute the longer edges of a rectangular card or document. The term lengthwise refers to feeding the cards such that the two shorter edges are the leading and trailing edges respectively.

As important as it is not to damage the leading edge of the cards fed through a card reader, it is even more important not to damage the stored information, i.e., the punched holes or the marks. In order to prevent ripping of the holes, or smudging or double printing of the marks, it is necessary to minimize contact of the card reader transport system with the holes or marks. This criterion calls for an integrated system design which permits the card to be transported from feed bin to receiving bin with such minimum contact.

SUMMARY OF THE INVENTION

It is an object of this invention to provide an improved card reading device having a picking arrangement designed to optimize conditions for efficient picking of damaged cards, and efficient handling of undamaged cards without damaging of same. This objective further is to be obtained with an improvement which is simple and reliable, and which involves negligible additional expense to the overall apparatus.

It is another object of this invention to provide a card reader with a throat arrangement which is optimally adapted to separate and pass cards, which cards are generally predominantly of a uniform thickness but also comprise statistically a certain number of cards of non-uniform thickness. The design objective of the card reader also includes passing the cards in such a manner that both the leading edge and the remainder of the card are minimally vulnerable to damage while in transport through the reader.

It is yet another object of this invention to provide a card reader picking and transport system integrally designed to minimize alteration to the information carried by the cards fed through the reader.

In accordance with the above objectives, there is provided a card reader having a storage compartment or bin for holding a stack of cards, transport and picking means for transporting the cards separately for card reading or sensing, and a collecting bin for collecting the separately transported cards. The transporting means includes a throat arrangement, typically defined by a knife and throat block, positioned relative to the storage bin so as to present a passageway to the cards for passage out of the storage bin. The passageway is defined by opposed and complimentary toothed surfaces, which surfaces are interrupted by opposing flat, or toothless, portions located in the center of the passageway. The throat and knife edges are positioned with respect to the card transport path so as to minimize contact with the center portion of the leading edge of the card, as well as to minimize the potential of damaging the transported card due to tearing caused by the throat teeth. The card reader transport apparatus maintains the position of the cards relative to the various elements which contact the cards so as to minimize contact of the cards at information-bearing locations.

BRIEF DESCRIPTION OF THE DRAWINGS

FIG. 1 is a side view showing the input bin, transport mechanism, and collecting bin of a card reader embodying this invention.

FIG. 2 is a detailed view of a portion of FIG. 1, showing the relationship of the throat to the input bin.

DESCRIPTION OF THE PREFERRED EMBODIMENT

Figure 4:
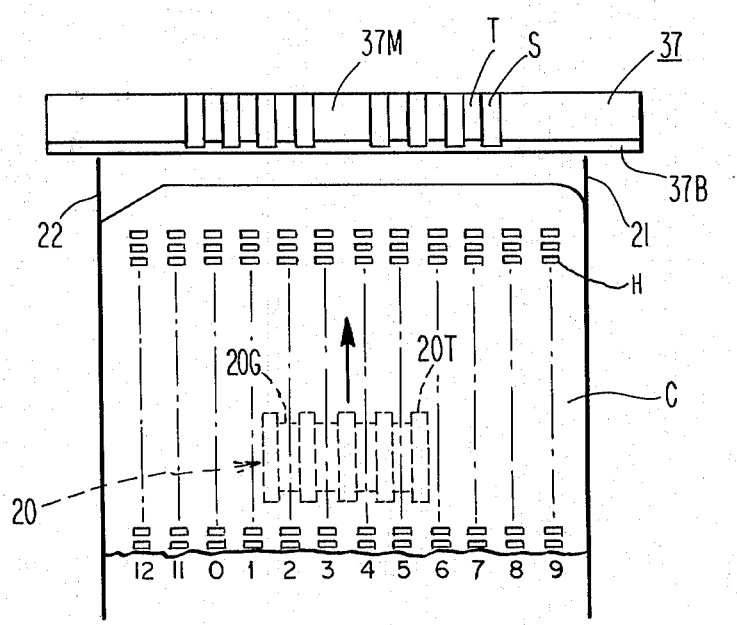
FIG. 4 is a schematic representation of an advancing card in relation to the throat block, illustrating the geometrical relationship of the throat teeth to the card structure, and showing the relationship of the picker roller to the card.
Figure 5:
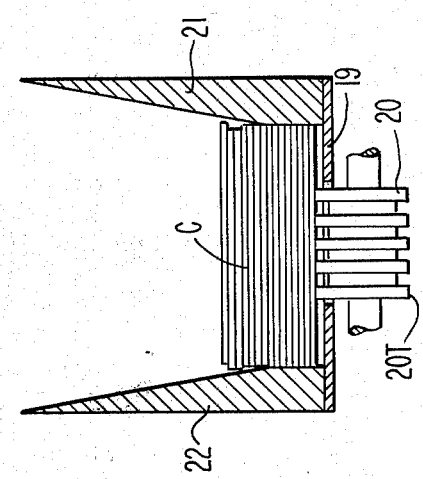
FIG. 5 is a section taken along line 5—5 of FIG. 1.

Referring now to the drawings, and in particular FIG. 1, the apparatus comprises a card input hopper, or bin 18, which has a bottom surface 19 inclined to the horizontal. The bin 18 has sides 21 and 22, as illustrated in FIG. 4, which constrain the position of the cards while in the bin and while moving out of the bin. The bottom card of a stack of cards placed in the bin 18 rests upon a picker wheel 20, preferably eccentric, which protrudes through a slot in the surface 19 such that a small arc of the eccentric portion of the wheel engages the bottom card in order to propel it out of the bin. The wheel 20 is suitably connected through its axle to a magnetically operated clutch, not shown, which is operated on command from an external signal source. The wheel 20, as illustrated in FIGS. 4 and 5, has outside rings, or teeth 20T, separated by grooves 20G, the outside surfaces of the teeth 20G being the portions that actually contact each card.

The forward wall 34 of hopper bin 18 is arranged at approximately a right angle to the hopper surface 19. Wall 34 has connected to it, at its lower end, a knife element 36, suitably made of hardened tool steel with an electroless nickel or hard chrome finish. As is seen in FIGS. 1 and 2, the forward surface 36' of knife 36 is inclined at an acute angle respect to bin floor member 19, so as to provide some initial separation of the cards C in the stack of cards placed in the hopper. Considering the cards which have their forward edges resting against knife surface 36', for each successively lower card in the pile the leading edge is advanced forward, due to the acute angle formed by surfaces 36' and 19. In other words, the angle formed by elements 19 and 36, in combination with the slope of element 19 with respect to the horizontal, causes the lower ones of the cards in bin 18 to align themselves such that each card protrudes forward slightly beyond that of the card directly above it.

Still referring to both FIGS. 1 and 2, the throat portion 35 is defined by the bottom edge of knife 36 and throat block element 37 which is embedded into bin floor 19. Knife 36 is connected to bin wall 34 by screw 39, which is suitably a socket head screw. Throat block 37 is connected to floor member 19 such that the very top portions thereof are flush with floor element 19. The top rearward edge of block 37 beveled, as indicated in FIG. 4, to facilitate passage of the bottom card C thereover. The beveled edge ensures that even if some portion of floor 19 is bowed downward, there is no blocking edge presented by throat block 37.

In operation, a command from an external source causes actuation of picker roller 20 to move the bottom card from the input hopper. The moved bottom card passes through throat 35, the picker roller continuing to drive until the leading edge of the card is captured by a first drive roller pair 25 and its accompanying pinch roller pair 28. The card is drawn past sensor device 30, which is indicated schematically, where encoded information is sensed. Device 30 is not a part of this invention, and no claims are drawn thereto. The card is then picked up by a second drive roller pair 26 and accompanying pinch roller pair 29, which cooperates to propel it toward and into receiving bin 40. Both rollers 28 and 29 are grooved and positioned so that they do not contact the passing cards where holes or marks are located. At the entrance to bin 40 is a ramp follower 42 hinged on axle 44. The card strikes follower 42 and is deflected downward and guided toward pivoted hopper floor 41. Further detail concerning follower 42 is set forth hereinbelow in connection with the discussion of FIG. 6. As the stack of cards in output hopper 40 builds up, it is contained by bin walls 48.

Figure 3:
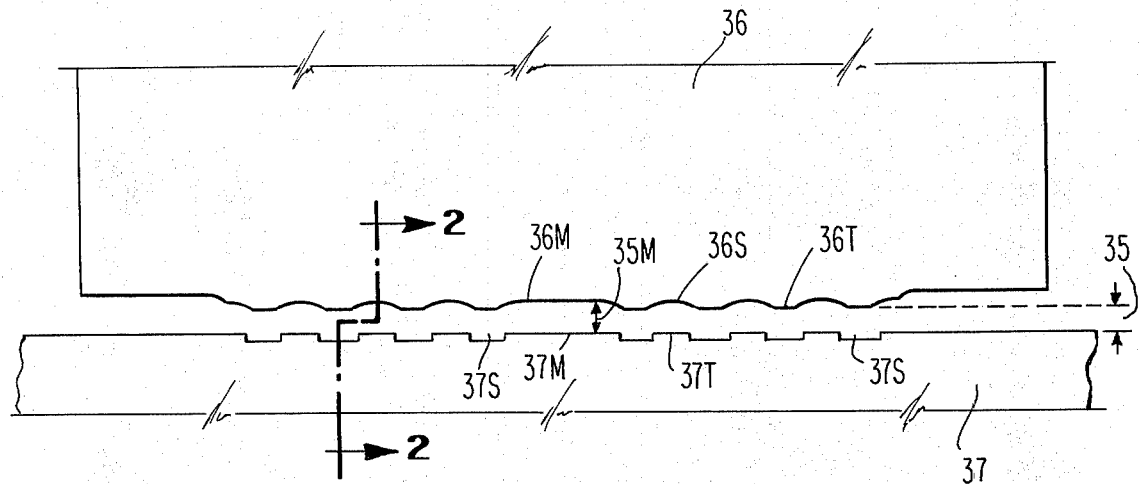
FIG. 3 is a schematic representation of the profile of the throat passageway.

Referring now to FIG. 3, there is shown a diagrammatic sectional view of the throat 35 which is formed by the lower edge of knife 36 and the upper edge of throat block 37. The throat block has a plurality of slots 37S notched into it, leaving relatively raised tooth portions 37T. The surfaces 37T are flush with the remainder of the block 37 which is not notched, and thus are approximately level with the bin floor 19. In the center of block 37, and extending across the entire block in the direction of card travel is a middle continuous surface 37M wherein there is no slot. Likewise, knife edge 36 has a series of toothed projections 36T, in between which are slot surfaces 36S. In the center portion of the bottom edge of knife 36 is a flat extended continuous portion 36M, which is devoid of teeth and which is positioned opposite 37M so as to provide a continuous toothless portion which is presented to the center of each card as it passes through the throat. Both 36M and 37M are substantially wider than either one of the teeth or one of the slots. It is to be understood that FIG. 3 is a diagrammatic rendering, and not necessarily to scale. The distance between knife 36 and throat block 37 is exaggerated in order to clearly indicate the important features of the geometry of the throat. In practice, the slots 37S may be typically 0.125 inch across, having a depth of about 0.015 inch. The teeth and slots of knife 36 are arranged complimentarily, and are of comparable dimensions. Thus, a tooth 37T is in registry with a slot 36S, and a slot 37S is in registry with a tooth 36T. The throat thickness is shown as indicated by the numeral 35, and is set at approximately 1.5 card stock edges. Also, importantly, the surfaces which define throat 35 are substantially flat and parallel with the direction of card travel.

Referring now to FIG. 4, there is shown diagrammatically a card C with a plurality of punched holes H therein. Card C is indicated as being moved forward along the line of direction indicated by the arrow, i.e. toward block 37. The card movement is constrained by bin sides 21 and 22. As seen in FIG. 4, the middle of the leading edge of the card C will pass over block 37 in the region of flat middle portion 37M, and necessarily also in registry with portion 36M of the knife. Also, it is seen that each row of punched holes passes over a tooth T of block 37. Since the teeth 37T are all flush with the top of block 37 and bin floor 19, these teeth do not represent potential obstructions by which the card could be snagged at a hole during transport through the throat. Due to the complimentary registration of knife 36 and throat 37, the holes of the cards pass through the throat opposite slots 36S in the knife. The geometry thus dictates that the teeth 36T of the knife, which represent potential obstructions for snagging the holes H, are all in registry with a solid portion of card stock between rows of holes. By this arrangement, the teeth 36T are never in registry with a row of holes, and the possibility of having the teeth in the throat area cause damage to the passing card is minimized. It is to be noted that this arrangement is feasible when the cards are advanced lengthwise through the throat region, as illustrated. When the cards are advanced sidewise through the throat region, such that the long dimension contitutes the leading edge, it is not possible to realize an optimized arrangement of the throat teeth with respect to the punched holes.

The arrangement of this invention is also effective for marked cards, in readers where the presence or absence of a mark, as contrasted to a punched hole, is sensed. By locating the knife teeth so that they register with portions of the card between the marked rows, and do not register with the marks, the design prevents smearing of the mark due to passing contact with the knife edge.

Still referring to FIG. 4, there is shown diagrammatically the position of picker roller 20 with respect to the card being picked, and more particularly the position of the teeth 20T and grooves 20G relative to the punched or marked information. The advancing card is constrained so that the teeth 20T and grooves 20G are fixed in position relative to the punched or marked information. More particularly, the teeth 20T contact the card between rows of holes or marks, and the grooves register with the holes or marks. In this manner, tearing of the holes is minimized and likewise smudging or double printing of marks by roller 20 is eliminated. This feature is also illustrated in FIG. 5, where it is seen that only the teeth 20T contact the card which is being picked. The chamfered inner edges of bin walls 21 provide play for the cards in bin 18, and cooperate with the angle of knife edge 36 and the lobed picker 20 to permit efficient feed downward and forward. The bottom portions of the inner surfaces of walls 21 are straight, and positioned to constrain the cards for proper registry with roller 20 and throat 35.

Figure 6:
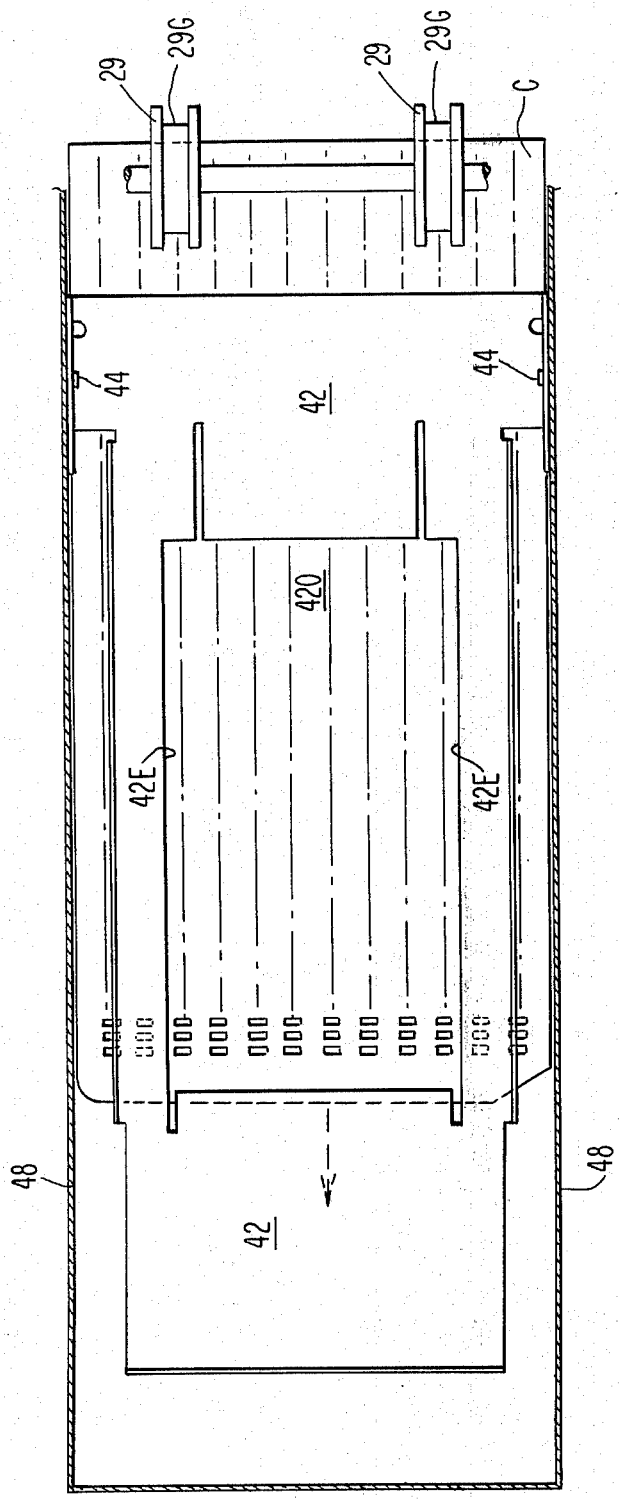
FIG. 6 is a schematic representation looking down upon the ramp follower in the receiving bin, showing the relationship of the follower to the card below it.

Referring now to FIG. 6, there is illustrated the follower 42 in relation to a card D therebelow. Follower 42 has an opening 42O which serves the purpose of inhibiting attraction, as by static electricity, of an entering card to the follower. The lengthwise edges 42E of opening 42O are positioned to register with the cards between rows of holes or marks, again for the purpose of minimizing tearing or smearing. The cards are constrained laterally by roller pair 26–29 are they advance into bin 40, so that the rows of holes or marks do not register with edges 42E. Also, as seen in FIG. 6, pinch rollers 29 are positioned so that their respective groove 29G register with rows of holes or marks, as is also the case for pinch rollers 28.

In practice, it has been determined that the invention as described in this specification provides an improved performance in that the toothed throat permits greater passage of cards which have irregular card thicknesses, while minimizing new damage or destruction to good cards as they pass through the throat area. It has been determined that the fewer the number of teeth the greater the ability of the picking arrangement to pick bad cards. However, if the number of teeth is simply reduced, the advantage of being able to better pick bad cards is offset by the greater tendency of the throat to damage good cards. In other words, a design with a greater number of teeth is gentler on cards, the limiting case being when there are no teeth at all. However, the more teeth, the less the ability of the throat to tolerate thickness variations. The arrangement of this invention produces a result beyond anything possible by simply optimizing the tooth distribution. In addition, by arranging the geometry of the throat teeth with respect to the rows of holes in the cards which pass therebetween, there is achieved vast improvement in damage to good cards. For example, tests have been run where undamaged cards have been passed through a throat having teeth uniformly positioned therealong, the cards being advanced through the throat lengthwise. In an intolerable number of instances in these tests, the cards were snagged by the teeth as they passed through the throat, rendering the card useless. By contrast, using the apparatus of this invention, such tooth snagging is eliminated.

Another substantial advantage of the improved throat as presented in this invention results from the spacing in the middle 35M wherein no teeth are located. It is particularly important that cards be processed without damaging the middle of the leading edge, for reasons set forth hereinabove. Thus, it is even more critically important that the very middle of the leading edge of the card not be damaged. By having an extended regular space in the middle portion, the incidence of damage to the leading edge of the card, in the form of scuffing, is dramatically reduced.

Another substantial improvement provided by this invention is derived from the positioning of elements of the system relative to the cards so as to minimize contact with the card information, thus maximizing the integrity of the information. Thus, the picker roller, the throat, the pinch rollers and the receiving bin follower are all integrally positioned to minimize such contact.

It is noted that the apparatus and method of this invention is adapted for handling a wide variety of cards and documents, and the invention as claimed is not limited in use to any particular form of document.

What is claimed is:

1. Card reader apparatus comprising:
   a. a storage bin for holding a plurality of data cards;
   b. a collecting bin for collecting cards transported from said storage bin; and
   c. transport and picking means for transporting cards separately from said storage bin to said collecting bin, and comprising a throat having two edges defining a passageway for passage therethrough of said transported cards, said passageway being characterized by having a portion with a plurality of opposing complimentary teeth and an extended toothless regular middle portion, the distance between said edges in said passageway at said middle portion being about the same as at the portion with complimentary teeth.

2. The apparatus as described in claim 1, wherein said apparatus comprises a knife and a throat block, respective end edges of said knife and throat block forming said throat, and said knife and throat block having complimentary teeth along their end portions to each side of said extended regular middle portion.

3. The apparatus as described in claim 2, wherein said bin and said transport and picking means cooperate to feed said cards through said card reader in a lengthwise fashion.

4. The apparatus as described in claim 3, wherein said cards contain information in predetermined positions thereon, said bin having a bin floor and bin sides, said throat block having a top edge approximately flush with said bin floor, and the teeth of said knife edge being positioned with respect to said bin sides so that when a card is passed through said throat the knife teeth are substantially in registry only with portions of the card between said predetermined information positions.

5. The apparatus as described in claim 4, wherein said knife is positioned at an acute angle with respect to said bin floor, and said bin floor is positioned at an angle to the horizontal.

6. The apparatus as described in claim 4, where the lower edge of said knife and the upper edge of said throat block are substantially coplanar.

7. The apparatus as described in claim 4, wherein said cards contain punched hole information in said predetermined positions.

8. The apparatus as described in claim 4, wherein said cards contain marked information in said predetermined positions.

9. Document reading apparatus, comprising:
   a. delivery means for delivering one document at a time in a lengthwise direction, said delivery means further comprising throat means positioned so that said delivered documents are delivered therethrough; and
   b. said throat means including
      i. a knife having a first edge, said first edge having a plurality of teeth separated by slots and an extended straight section at about the middle thereof, and
      ii. a throat block having a second edge, said second edge having a plurality of teeth separated by slots and disposed complimentarily to said teeth and slots of said knife edge, said throat block edge having an extended straight section at about the middle thereof in registry with said knife edge straight section.

10. The apparatus as described in claim 9, wherein said teeth and slots are uniform in length, and one of said extended straight sections extends for at least a length equivalent to about the length of one of said teeth and two of said slots, and said straight sections are about equal in length.

11. In a card reader having a throat defined by two edges, said throat edges having complimentary teeth therein and slots between said teeth, and a spaced regular portion in the center thereof, said card reader being adapted to transport therethrough cards having punched hole information thereon, said punched hole information being in predetermined locations of each said card and each said card being passed through said throat in a predetermined relationship thereto, the method comprising feeding said cards lengthwise through said throat, and feeding said cards so that the protruding teeth on a predetermined one of the edges of said throat are not in registry with any of said holes while said each card is passed through said throat.

12. The method as described in claim 11, comprising feeding said cards through said throat so that the holes in said cards are substantially in registry with the teeth on a first of the two edges defining said throat and with the slots on the second of said edges.

13. The apparatus as described in claim 9, wherein said delivery means comprises an eccentric picker roller.

14. Card reader apparatus comprising:
   a. a storage bin for holding a plurality of data cards;
   b. a collecting bin for collecting cards transported from said storage bin;
   c. transport and picking means for transporting cards separately from said storage bin to said collecting bin, and comprising a throat defining a two edged passageway positioned for passage therethrough of said cards singly, said throat being characterized by having complimentary teeth along at least portions of said two edges; and
   d. wherein said cards contain information predetermined positions thereon, and said transport and picking means is characterized in that the teeth on one of said edges are substantially in registry only with portions between said predetermined information positions of each said transported card.

15. The apparatus as described in claim 14, wherein said transport and picking means comprises a picking roller positioned to contact said cards only at portions thereof between said information positions.

16. The apparatus as described in claim 15, wherein said storage bin contains chamfered inner walls, and said picking roller is lobed.

17. The apparatus as described in claim 14, wherein said transport and picking means comprises pinch rollers having grooves therein, and positioned so that they contact said cards only at portions thereof between said information positions.

18. The apparatus as described in claim 17, wherein said collecting bin comprises a follower having an opening therein, said opening having lengthwise edges positioned so that they contact said cards only at portions thereof between said information positions.

* * * * *

UNITED STATES PATENT OFFICE
CERTIFICATE OF CORRECTION

Patent No. 3,975,010　　　　　　　　Dated August 17, 1976

Inventor(s) John C. Schisselbauer et al

It is certified that error appears in the above-identified patent and that said Letters Patent are hereby corrected as shown below:

Column 8, line 25, after "information", insert --in--.

Signed and Sealed this

Ninth Day of November 1976

[SEAL]

Attest:

RUTH C. MASON
*Attesting Officer*

C. MARSHALL DANN
*Commissioner of Patents and Trademarks*